United States Patent [19]

Lowery et al.

[11] 3,875,373
[45] Apr. 1, 1975

[54] VACUUM-APPLIED HEATING PAD
[75] Inventors: Patrick A. Lowery, Federal Way; Richard L. Egger, Bellevue, both of Wash.
[73] Assignee: The Boeing Company, Seattle, Wash.
[22] Filed: Feb. 14, 1974
[21] Appl. No.: 442,457

[52] U.S. Cl.................. 219/526, 219/528, 219/536, 219/549, 219/494, 338/393
[51] Int. Cl. .............................................. H05b 3/06
[58] Field of Search ........... 219/469, 494, 526, 527, 219/528, 535, 536, 549; 13/31; 128/397; 338/211, 212, 293, 297, 301

[56] References Cited
UNITED STATES PATENTS

| | | | |
|---|---|---|---|
| 1,593,359 | 7/1926 | Randolph | 219/549 X |
| 1,713,710 | 5/1929 | Parks | 219/526 X |
| 1,737,460 | 11/1929 | Johnson | 219/528 |
| 1,994,759 | 3/1935 | Dermont | 219/528 |
| 2,003,028 | 5/1935 | Zeiger | 219/526 |
| 2,489,643 | 11/1949 | Hunter | 219/549 X |
| 3,166,667 | 1/1965 | Norton | 219/469 |
| 3,281,579 | 10/1966 | Glicksman | 219/535 |

Primary Examiner—Volodymyr Y. Mayewsky
Attorney, Agent, or Firm—Christensen, O'Connor, Garrison & Havelka

[57] ABSTRACT

Disclosed is a disc-shaped, vacuum-applied, heating pad for applying heat and pressure during bonding of an object to a thermally conductive substrate using a thermosetting adhesive. The pad includes a flexible, resilient body having a generally flat bottom surface and a flexible vacuum lip depending downwardly from and around the periphery of the body. The lip terminates below the lower surface of the body such that the body and the lip define a shallow cavity on the underside of the pad. A flexible, metal foil electrical heating element is disposed on the underside of the body. The heating element is annular in shape, the aperture therein being positionable over the object to be bonded so that heat is transmitted from the heating element through the substrate and thence to the thermosetting adhesive disposed between the object and the substrate. Pressure is applied to the object being bonded by evacuating the cavity via a vacuum conduit communicating with the cavity and with the exterior of the pad. As the flexible pad is drawn down by the vacuum, the portion of the pad body within the aperture in the heating element contacts the object and applies pressure thereto.

7 Claims, 5 Drawing Figures

PATENTED APR 1 1975  3,875,373
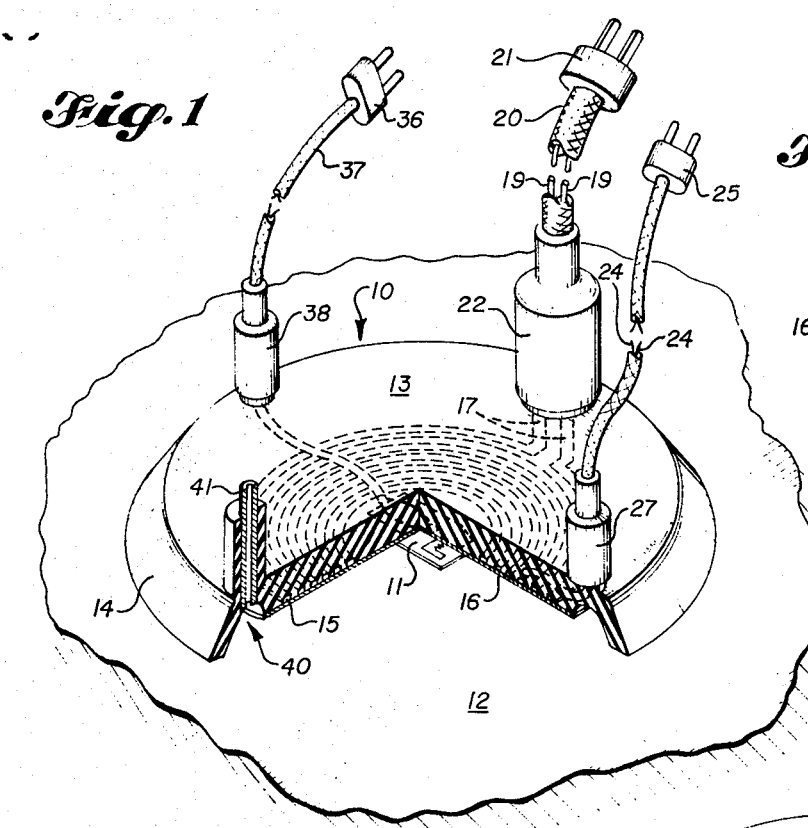
Fig. 1
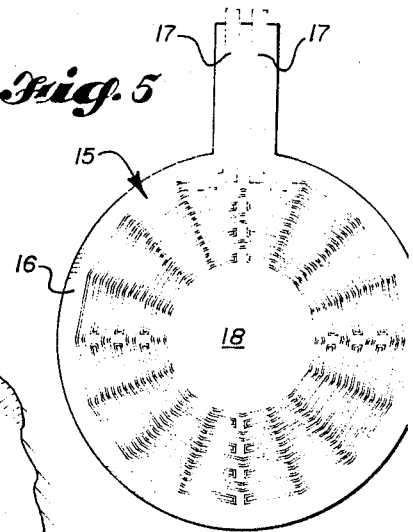
Fig. 5
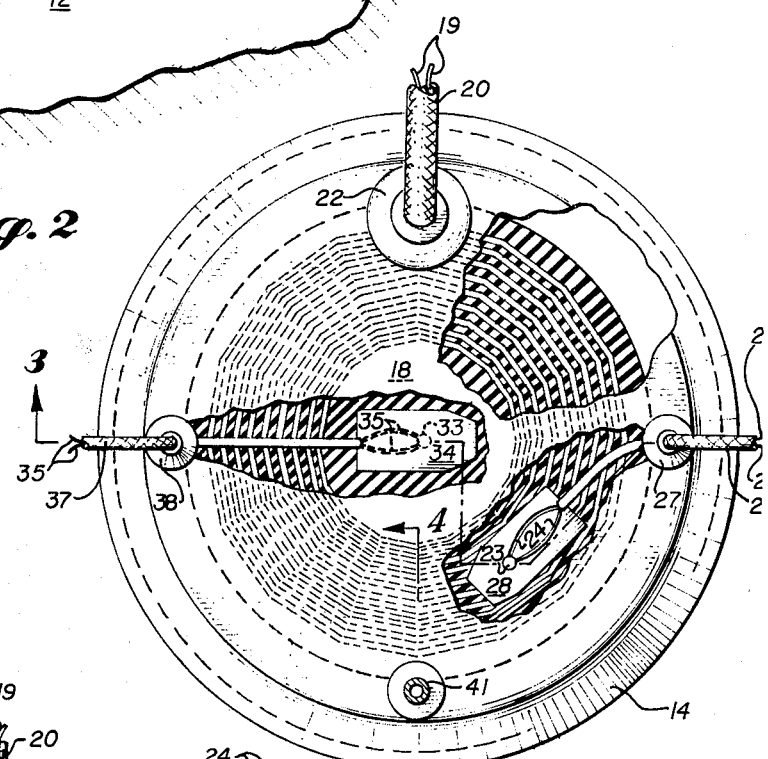
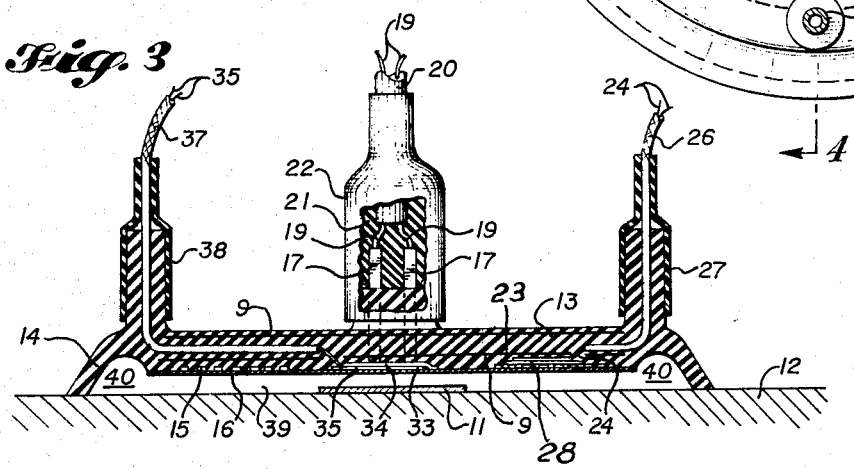
Fig. 2
Fig. 4
Fig. 3

VACUUM-APPLIED HEATING PAD

BACKGROUND OF THE INVENTION

This invention relates to apparatus useful for applying heat and pressure during hot bonding of small objects such as strain gages and temperature sensors to thermally conductive base structures.

Strain gages and temperature sensors are commonly bonded to a substrate or base structure (relative to which measurements are to be taken) by means of thermosetting adhesives. Conventional techniques for applying heat and pressure during such bonding operations include placing a resilient pad (e.g., of silicone rubber) over the gage or sensor, applying pressure by means of clamps or a vacuum bag and then heating by means of an oven, radiant lamps, or flexible heating blankets. Attempts to use available flexible heating blankets, which have wire-type heating elements, have not been very successful because of their typically poor heat transfer characteristics and low heating capacities. Operation of such blankets at high power intensities usually results in overheating of and damage to the blanket and/or the heat-sensitive gages or sensors.

Apparatus of the type just discussed lacks versatility, is bulky, and is inconvenient to set up, especially where the gage or sensor is to be positioned in a confined or otherwise inaccessible location. Furthermore, strain gages and temperature sensors typically are poor heat conductors and are adversely affected by high temperatures (e.g., over 500 °F.). Because of this heat sensitivity, heating of the gage or sensor must be carefully controlled so as to obtian curing of the thermosetting adhesive without overheating the gage or sensor. Such control is difficult with some prior art apparatus.

It is therefore a broad object of the present invention to overcome or mitigate the mentioned disadvantages and limitations of the prior art by providing a compact, easily applied, vacuum-actuated heating pad useful for applying heat and pressure during the hot bonding of objects such as strain gages, temperature sensors and the like to thermally conductive base structures. It is another object to provide a heating pad of the type just described in which the heating capacity of the heating element and the heat transfer characteristics of the pad are such that rapid, relatively uniform heating of the bonding material can be achieved while avoiding overheating of the heating pad and the object being bonded. A specific object related to that just mentioned is to provide such a heating pad so constructed that heating of the bond material is primarily effected by conduction through the substrate rather than through the gage or sensor being bonded. A further object is to provide such a heating pad that can be applied both to flat and contoured surfaces. Another object is to provide such a heating pad including means for monitoring the temperature of the object being bonded and the temperature of the heating element. Yet another object is to provide such a heating pad with an effective vacuum lip around the periphery thereof for establishing a dependable seal between the pad and surfaces to which it is applied. Other objects and advantages of the present invention will become apparent from the following description taken in conjunction with the accompanying drawings.

SUMMARY OF THE INVENTION

The vacuum-actuated heating pad of the present invention comprises a flexible body having a flexible, vacuum lip depending downwardly from and around the periphery thereof. The bottom surface of the body is preferably flat, but may instead be convex or concave, for example, depending on the type of the surface to which it is to be applied. The pad also includes means defining a passage in fluid communication with the underside and upperside thereof. A flexible electrical heating element having an aperture therein is disposed on the underside of the body and conforms to the shape thereof. The heating element and the aperture therein are preferably annular in shape. Also, the heating element is preferably sheet-like in configuration and most preferably is a metal foil resistive element.

In a preferred embodiment of this invention, the heating pad includes a pair of temperature sensors, e.g., thermocouples, one being positioned over and immediately adjacent to the heating element for sensing the temperature thereof and the other being spaced from the heating element and disposed within or immediately adjacent to the aperture therein. In the preferred embodiment of this invention, the vacuum lip is inclined downwardly and outwardly from above the lower surface of the pad body such that the lip and the edge of the pad body define a manifold channel which is recessed upwardly from the lower surface of the pad body, extend around the pad body and communicates with this conduit.

The vacuum-actuated heating pad of this invention is particularly useful in bonding of small objects such as strain gages and temperature sensors to thermally conductive base structures by means of a thermosetting adhesive. When so used, the pad is positioned with the aperture in the heating element disposed over the object being bonded so that heat generated by the heating element is transferred to the bonding material primarily by conduction through the underlying base structure. Conduction of heat to the adhesive in this manner has been found to avoid overheating of the object being bonded.

BRIEF DESCRIPTION OF THE DRAWINGS

FIG. 1 is an isometric view of a preferred vacuum-actuated heating pad according to the present invention with parts broken away.

FIG. 2 is a plan view of the pad of FIG. 1 with parts broken.

FIG. 3 is a staggered vertical cross section taken along line 3—3 of FIG. 2.

FIG. 4 is a vertical cross section taken along line 4—4 of FIG. 2.

FIG. 5 is a reduced plan view of the heating element of the pad of FIGS. 1–4.

DETAILED DESCRIPTION OF THE INVENTION

In FIGS. 1–4 (wherein like parts bear like reference numerals) there is shown a preferred vacuum-actuated heating pad 10 positioned over a strain gage 11 on a workpiece 12. The pad is comprised of a flexible, resilient body 13 having a substantially flat lower surface. A flexible, vacuum lip 14 depends from and extends around the peripheral edge of the body. The body 13 and vacuum lip 14 are preferably made of silicone rubber and molded together in a single unit. The silicone rubber preferably is of a heat curing type that is not degraded by temperatures up to 500° F.

Molded into the lower surface of the pad body is a laminate consisting of a thin, sheet-like, flexible, annular heating element 15 bonded to an underlying thin, flexible silicone-rubber/fiberglass substrate 16. The substrate 16 serves both as a support for the heating element and as electrical insulation therefor.

The heating element/substrate laminate limits shrinkage of the lower portion of the pad body during curing. To compensate for this and prevent distortion of the pad body, discs of woven fiberglass 9 (shown only in FIGS. 3 and 4) are included in the upper portion thereof.

The heating element 15 (the details of which are only shown in FIG. 5) is a metal foil resistive element which can be fabricated using conventional etching techniques. The element consists of a continuous strip of thin metal foil patterned such that the heating element and aperture 18 therein are substantially circular in shape. The strip bends back on itself at a number of dispersed locations so that the ends of the strip 17 (which serve as leads connectable to a source of electricity) are located adjacent one another on the periphery of the heating element. To obtain optimum heating capacity and heat transfer characteristics the metal foil will usually be from 1 to 4 mils thick and the insulating substrate from 2 to 8 mils thick. A preferred heating element as shown in FIG. 5 was etched from a laminate of 1.9-mil thick, 55 Cu—45 Ni alloy on a 5-mil silicone rubber/fiberglass substrate. (Circuit laminates etched from 1.5-mil nickel foil on a 5-mil substrate have also exhibited high heating capacity and good heat transfer characteristics when used in heating pads according to this invention.)

As best seen by reference to FIG. 3, a pair of conductors 19 from an electrical cable 20 are connected to heating element leads 17. The cable 20 terminates in a conventional electrical plug 21. The heating element leads 17 and ends of conductors 19 are encased in silicone rubber (molded separately from the pad body and lip) surrounded by a sleeve 22 (formed from heat shrinkable plastic tubing) which secures the cable 20 to the pad body 13 as shown. Electricity is preferably supplied to the heating element from an autotransformer or other variable power source.

Embedded in the pad body 13 immediately above the heating element 15 is an outer thermocouple 23 for sensing the temperature of the heating element. The outer thermocouple wires 24 lead to a thermocouple connector 25. A sheath 26 containing wires 24 is secured to the pad body by a plastic sleeve 27. The wires 24 are electrically insulated from the heating element by a thin, silicone rubber/fiberglass strip 28. Prior to molding of the pad body, the strip is uncured and tacky and holds the wires in place during the molding operation.

An inner thermocouple 33 is also embedded in the pad body within the aperture 18 in the heating element 15. The purpose of this thermocouple is to sense the temperature of the gage 11 bonded to the substrate or workpiece 12. The inner thermocouple 33 is spaced from the heating element. A thin, silicone rubber/fiberglass strip 34 adhered to the heating element substrate 16 covers the inner thermocouple wires 35 and holds them in place during molding of the pad body. The inner thermocouple wires 35 lead to a thermocouple connector 36. A sheath 37 containing wires 35 is secured to the pad body by a plastic sleeve 38.

Referring now in particular to FIGS. 3 and 4, it will be seen that the vacuum lip 14 depends downwardly and outwardly from the peripheral edge of the pad body and terminates in a planar edge below the lower surface of the pad body. The body and lip thus define a shallow cavity 39 in which objects to be applied to a substrate can be accommodated. It has been found that when embodied in heating pads of this invention a vacuum lip configured as just described makes it possible to use the pads on simple and compound contours, facilitates rapid application of the pads and provides and highly dependable vacuum seal.

Still referring to FIGS. 3 and 4, it will be seen that the lip extends downwardly and outwardly from a point above the lower surface of the pad body such that the inner side of the lip and the peripheral edge of the pad body define a downwardly open recess 40 extending around the inner circumference of the pad above the lower surface of the pad body. This recess serves as a vacuum manifold communicating with a copper tubing 41 defining a passage 42 through which a vacuum can be applied to evacuate cavity 39.

When the pad is pressed onto the base structure 12 and vacuum is applied to the underside of the pad via tubing 41, atmospheric pressure forces the flexible pad body downwardly such that the part of the lower surface of the pad immediately under the heating element aperture 18 contacts the gage 11 and applies pressure thereto. The pad is sufficiently flexible that substantially all the remainder of the lower surface of the pad contacts the base structure thus assuring effective heat transfer from the heating element.

The following is a description of tests to which the pad depicted in FIGS. 1–4 was subjected. The overall diameter of the pad, the heating element and the heating element aperture are about 3 inches, 2¼ inches and 1 inch, respectively. The pad includes the 55 Cu—45 Ni alloy heating element described previously and configured as shown in FIG. 5. The heating element was connected to a 120-volt auto-transformer, the thermocouples to a temperature recorder and the vacuum conduit to a vacuum source. The pad was applied to the center of a ¼ × 36 × 36-inch aluminum plate and the power was adjusted such that the temperature of the inner thermocouple reached 250°F. before heat was conducted to the edge of the plate (as determined by touch). This served to demonstrate that had the plate been infinitely larger, the heating pad would still have heated the portion of the plate under the heating element aperture to 250°F. Under the recited conditions, the 250°F. temperature was attained in only 6 minutes at heater temperatures that did not exceed 450°F. The power was then reduced to maintain the 250°F. temperature at the inner thermocouple; the heater temperature decreased to 430°F. From voltage and amperage readings taken during reduced power operation, it was determined that the heater was operating at about 290 watts (2.8 amps at 104 volts). Repeating the just-described test with a simulated strain gage positioned under the heating element aperture gave virtually no change in temperature readings. This indicated that the inner thermocouple gave an accurate indication of the temperature under the gage (i.e., the bond line).

As indicated previously the preferred heating pad shown in FIGS. 1–4 is particularly useful for bonding thin, flat objects to a substrate. It will be apparent, however, that thicker objects could be accommodated if the underside of the pad were provided with a downwardly open recess extending through the aperture in the heating element. It will also be apparent that the heating element and the aperture therein need not be circular in shape. Thus, the heating element and/or aperture could be rectangular or elliptical or of some other shape and size similar to that of the objects to be bonded.

What is claimed is:

1. A heating pad for pressing an object against a support and simultaneously heating the object and the region of the support surrounding said object, comprising:

a vacuum pad comprising a relatively thin body of resilient flexible material, said body defining a surface, and a flexible lip depending from and extending around the peripheral edge of said body so as to surround said surface and with said surface define a cavity, said vacuum pad including a passageway suitable for allowing air to be exhausted from said cavity;

a flexible sheet-like, metal foil, heating element affixed to said surface of said body, said heating element defining an aperture spaced inwardly from the periphery thereof, and, electrical connecting means for connecting said heating element to a source of electricity;

said vacuum pad and said heating element being formed in a manner such that when: (a) said lip is placed against a suitable support; (b) an object is located between said surface and said support in the region generally defined by said aperture; and (c) said cavity is evacuated, said object is pressed against said support and substantially all of said thin, sheet-like, flexible heating element is pressed toward said support around said object in a manner such that heat generated by said heating element causes said support to be heated in the region surrounding said object.

2. A heating pad as claimed in claim 1, wherein said surface is substantially planar.

3. A heating pad as claimed in claim 1, wherein said heating element is annular in shape and wherein the area surrounded by said annular shape forms said aperture.

4. A heating pad as claimed in claim 1, including a first temperature sensing means mounted in said body adjacent to said heating element for sensing the temperature of said heating element.

5. A heating pad as claimed in claim 4, including a second temperature sensing means mounted in said body in the region generally defined by said aperture for sensing the temperature in the region generally defined by said aperture.

6. A heating pad as claimed in claim 1, including a thin, flexible, sheet-like substrate located on the side of said heating element remote from said surface defined by said body of said vacuum pad, said substrate and said heating element forming a laminate structure.

7. A heating pad as claimed in claim 1, wherein said heating element and said aperture are substantially concentric.

* * * * *